(12) United States Patent
Alexander et al.

(10) Patent No.: US 9,210,454 B2
(45) Date of Patent: *Dec. 8, 2015

(54) METHODS AND SYSTEMS FOR A CURRENT CHANNEL BUFFER FOR NETWORK BASED PERSONAL VIDEO RECORDING

(71) Applicant: ERICSSON TELEVISION INC., Duluth, GA (US)

(72) Inventors: James Alexander, Denver, CO (US); Joe Buehl, Studio City, CA (US)

(73) Assignee: ERICSSON AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,493

(22) Filed: Jun. 3, 2014

(65) Prior Publication Data

US 2014/0289785 A1   Sep. 25, 2014

Related U.S. Application Data

(63) Continuation of application No. 12/275,909, filed on Nov. 21, 2008, now Pat. No. 8,776,157.

(51) Int. Cl.
*H04N 5/91* (2006.01)
*H04N 7/173* (2011.01)
(Continued)

(52) U.S. Cl.
CPC .......... *H04N 21/2387* (2013.01); *G11B 27/005* (2013.01); *H04N 7/17318* (2013.01); *H04N 21/231* (2013.01); *H04N 21/2381* (2013.01); *H04N 21/23106* (2013.01); *H04N 21/25816* (2013.01); *H04N 21/4333* (2013.01); *H04N 21/4334* (2013.01); *H04N 21/47202* (2013.01); *H04N 21/6125* (2013.01); *H04N 21/64322* (2013.01); *H04N 21/64761* (2013.01); *H04N 21/6587* (2013.01)

(58) Field of Classification Search
CPC .......... H04N 21/2387; H04N 21/4333; H04N 21/6582

See application file for complete search history.

(56) References Cited

U.S. PATENT DOCUMENTS

2002/0124258 A1   9/2002   Fritsch
2003/0039471 A1*  2/2003   Hashimoto ................... 386/111
(Continued)

FOREIGN PATENT DOCUMENTS

WO   WO 01/93587 A2   12/2001

*Primary Examiner* — Benjamin R Bruckart
*Assistant Examiner* — Carmine Malangone (57) ABSTRACT

A "pause live television" service is implemented, where in one embodiment, a continuously streaming video from a broadcast programming source is copied into a circular buffer. A set top box ("STB") requests a trick function, such as "pause," by sending a message to the system, which in one embodiment suspends the display of the present broadcast video in the STB. The system determines an pointer and when the user requests resumption of the broadcast video (e.g., "play"), the system uses the pointer for that particular STB to determine the appropriate resumption point in the particular buffer to resume streaming of the video for that STB. In various embodiments, the network may begin streaming of the video at the resumption point on another channel and direct the STB to then tune to that channel. Thus, the program appears to have been seamless suspended and resumed using a network based capability.

8 Claims, 8 Drawing Sheets

(51) Int. Cl.
*H04N 21/2387* (2011.01)
*H04N 21/231* (2011.01)
*H04N 21/258* (2011.01)
*H04N 21/433* (2011.01)
*H04N 21/472* (2011.01)
*H04N 21/647* (2011.01)
*H04N 21/6587* (2011.01)
*G11B 27/00* (2006.01)
*H04N 21/2381* (2011.01)
*H04N 21/61* (2011.01)
*H04N 21/643* (2011.01)

(56) References Cited

U.S. PATENT DOCUMENTS

| | | | |
|---|---|---|---|
| 2003/0208767 A1 | 11/2003 | Williamson et al. | |
| 2004/0230994 A1* | 11/2004 | Urdang et al. | 725/88 |
| 2004/0255336 A1* | 12/2004 | Logan et al. | 725/135 |
| 2005/0160465 A1* | 7/2005 | Walker | 725/86 |
| 2005/0166237 A1* | 7/2005 | Kawakami | 725/50 |
| 2005/0251835 A1* | 11/2005 | Scott et al. | 725/88 |
| 2007/0124751 A1* | 5/2007 | Le Fevre et al. | 725/6 |
| 2007/0199031 A1* | 8/2007 | Nemirofsky et al. | 725/88 |
| 2008/0193104 A1 | 8/2008 | Hasek | |
| 2009/0113512 A1* | 4/2009 | Collet et al. | 725/132 |
| 2009/0150957 A1* | 6/2009 | Jerding et al. | 725/114 |

\* cited by examiner

METHODS AND SYSTEMS FOR A CURRENT CHANNEL BUFFER FOR NETWORK BASED PERSONAL VIDEO RECORDING

CLAIM OF PRIORITY

This application is a continuation application of U.S. patent application Ser. No. 12/275,909, filed Nov. 21, 2008, now pending. The contents of this document are hereby incorporated by reference herein.

FIELD OF THE INVENTION

The present invention generally relates to personal video recording services of real time broadcast content provided to a subscriber of a cable services provider.

BACKGROUND OF THE INVENTION

The viewing of video programs has been impacted by various consumer electronic devices, such as VCRs, DVD players, and DVR recording capability in set top boxes. In the past, viewers could only view a network program in real-time as it was being broadcasted. With the above identified devices, viewers could not only view programs when they desired, but they could record such programs for later viewing, and when doing so, can invoke various functions, such as "pause," "rewind," and "play." These functions are sometimes referred to in the industry as "trick functions."

The incorporation of trick functions into consumer electronics has become a desirable and expected capability associated with viewing video programs by consumers. The above subscriber premised devices (e.g., the VCR, DVD, or DVR are all boxes located at the viewer's location and operated by the viewer) incorporate this capability. Further, the ability to view and control videos via a network based service is also available to viewers. This avoids the necessity of the viewer having to obtain and operate the device, and typically allows the viewer to access a larger selection of titles. One such service is known as "video on demand" ("VOD") and also provides the ability of the viewer to invoke trick functions.

However, live broadcast television, or network based television, is largely viewable only in real time without access to trick functions. While it is true that users can record a live television broadcast using premised based equipment (such as DVRs), and then invoke trick functions when subsequently viewing the program, the viewer is required to maintain the device at each television in the household, otherwise the viewer is limited to invoking this capability only at those televisions having such a device. Therefore, there is a need for viewers to be able to invoke trick functions on real time video broadcasts in real time using a network based service.

SUMMARY

In one embodiment, the present invention pertains to systems and methods for providing a "pause-live TV" ("PLTV") service to subscribers for real time television programming, in which buffers are allocated for storing video data associated with a television programming channel in real time. Storing the television program data in a buffer allows the user to invoke certain functions for controlling viewing of the program, including invoking "pause" and "resume" functions.

In one embodiment, a processor in the cable headend creates a pointer to a channel buffer based on viewer's request to "pause" a program which also includes a channel identifier. The processor uses the information to identify a buffer and a location therein to identify the point at which streaming is to resume when the viewer subsequently requests to "resume" viewing of the program. By managing a pointer associated with a buffer for that viewer's set top box, a processor in the cable headend can effectively and easily allow a user to control the viewing experience of a broadcast program within certain limitations. This approach avoids problems in providing the PLTV service that can occur when a television program extends beyond its scheduled broadcast time, and the electronic program guide is not updated in a timely manner.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The wide use of video devices such as VCRs, DVD players, and DVRs have instilled in viewers the expectation of the ability to invoke trick functions when viewing a video program, regardless of the means used for viewing the program. These trick functions may include: play, pause, rewind, and fast forward. The use of trick functions allows a viewer to control their video viewing experience. Similar capabilities are often available for network based services, which do not require the viewer to own or install the above equipment and allow the service to be invoked at any of the televisions in the user's household. For example, one commonly available service, video-on-demand ("VOD"), allows a user to select and view movies on demand. Many such network services allow trick functions to be invoked. However, this capability is largely unavailable for real-time network or live video programming.

It is possible to adapt existing video on demand equipment for performing a similar function in conjunction with broadcast or what is termed herein as real time network programming ("RTNP"). A fundamental distinction between VOD and RTNP is that in VOD the complete program has been previously stored and available for requesting playback. In RTNP, the programming may be produced and delivered live, or at least is being delivered in real time, so that the video information has not been previously stored to an appreciable extent by the cable operator. Hence providing trick functions, which inherently depend on the video program content being stored, cannot be invoked.

One approach is based on adapting existing VOD equipment to record RTNP, and making these programs available for viewers in real time. In such instances, the trick functions are implemented using VOD equipment, can be modified to operate on broadcast television to provide a network service similar to a network based personal video recording ("NPVR") service. For example, the "pause" function in a NPVR service functions similarly in that the "pause" function freezes the current image on the television. When the viewer resumes viewing by invoking the "play" or "resume" function, the user then returns to viewing the program at the point where the program was suspended. However, once "play" is invoked, the viewer is no longer connected to the real time streaming program, but is presented with video spooled from a storage device using the adapted VOD system that has been appropriately delayed. In essence, the VOD system is continuously recording broadcast video in order to provide a NPRV-like service. In this way, if a viewer invokes a trick function, the stored broadcast video can be used to provide a NPRV-like service to the viewer in a seamless manner.

Some traditional trick functions do not operate in the same way as they do with a traditional VOD service. For example, in regard to the fast forward function, this trick function is limited by the real time nature of the program. It is obviously not possible to fast forward beyond the present time when viewing a real-time live program. It is only possible to fast forward to the end of a program if the program has been previously stored and therefore accessible. Thus, if a RTNP is being recorded, and the viewer pauses the program for two minutes, it would be possible to fast forward only to the present point of recording of the program, which would be the present point of broadcasting of the RTNP program. On the other hand, if the RTNP has completed and has been stored in its entirety, then the program can be viewed just as a VOD program. Thus, it is clear that operation of NPVR trick functions is slightly different due to the nature of the real time nature of the program being viewed. Hence, one distinction from VOD is that the program is usually being recorded when the trick function is invoked, as opposed to VOD where the program has been (completely) recorded. Hence this service is referred to herein as Pause Live TV ("PLTV") in order to distinguish it from other types of similar capabilities.

Figure 1A:
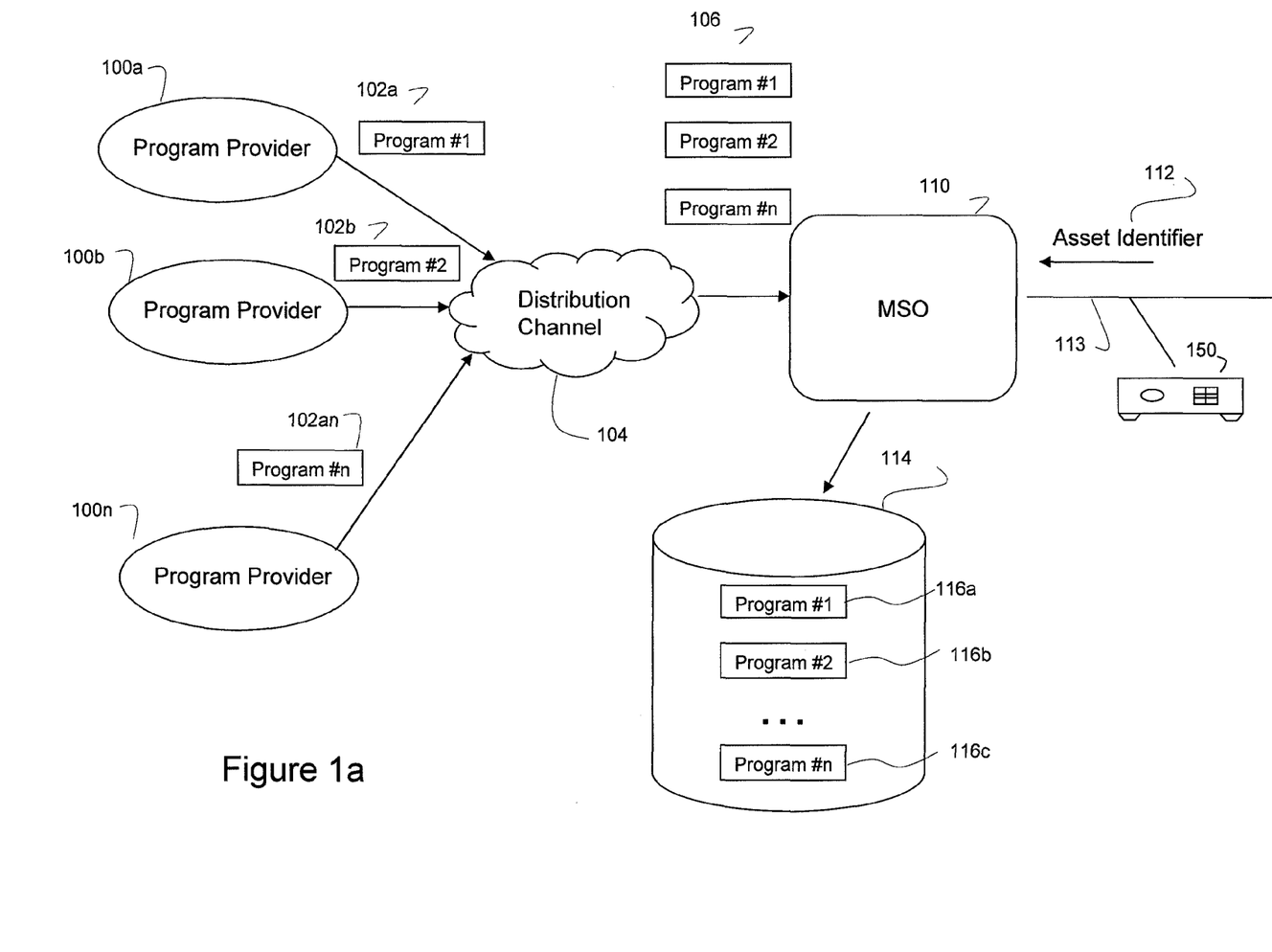
FIGS. 1a and 1b illustrate a prior art technique of storing programs on an individual program basis.

PLTV can implemented by modifying or adapting VOD servers. As noted above, one modification from VOD is that RTNP programs must be recorded in real time, in a continuous manner. Recall that VOD servers typically presume the library of available programs were previously recorded, and not being broadcasted in real time. Thus, infrastructure must be added to record the available programs as they are provided. FIG. 1 illustrates one embodiment of an architecture using adapted VOD equipment to implement a PLTV service. In FIG. 1, there are various program providers 100a-100n which originate real time programming. Examples include network programs (local or national), sports channels, etc. Each of these distributes a program 102a-102n through one or more distribution channels. In FIG. 1, a single logical distribution channel 104 is shown for simplicity. The distribution channel can utilize different physical technologies, such as satellite distribution systems, fiber optic based systems, fixed wireless distribution, or other technologies. The exact manner of program distribution is not that relevant, since the cable service provider or multiple system operator ("MSO") 110 essentially receives in some manner a plurality of programs 106 in real time.

The MSO 110 provides the received video programs 106 over a plurality of channels in real time, or near real time, over a cable distribution network 113. Subscribers attached to the cable distribution network can use their set top boxes 150 to decode a specific channel, which the viewer selects for viewing on their television (not shown). This portion of the cable network infrastructure for distribution of video programs is well known.

In one embodiment, in order to provide PLTV service, the MSO must store each program received in a modified VOD server, the PLTV system 114. In this representation, the PLTV system is depicted as a large database, since the primary function of the PLTV system is to store files. However, as it will be discussed, the PLTV system also includes other components, including processors, which are not shown in FIG. 1, which control and operate the database storage devices. These additional components are discussed later.

As used herein, the term "cable services provider" ("CSP") refers to a MSO operator that is providing PLTV service, and thus comprises both the traditional MSO 110 infrastructure and the PLTV system 114. The present disclosure illustrates application of the invention with respect to a cable services provider. However, application of the present invention is not limited to being utilized only by CSPs. Rather, the principles of the present invention can apply to various types of video program distributors, which would include CSPs, or other types of service providers that distribute digital video programs via satellite, fixed wireless technology (such as LMDS), mobile wireless (such as using cellular telephone 3G technology), fiber optic, cable, or a combination of the above. Specifically, a video program distributor would encompass IP based television service providers ("IPTV providers").

In one architecture, the PLTV system 114 stores each broadcast program 116a-c as a separate file. Each program, such as Program #1 116a is sometimes referred to generically as an "asset." Use of this term avoids confusion as to whether the contents of the program is a movie or some other type of program (e.g., television serial, documentary, new program etc.). In this particular context, the asset stored in the PLTV system is termed a "generic broadcast asset."

In this embodiment, the set top box is tuned to a particular channel, and the set top box processes the RTNP video as normal. When the viewer invokes a trick function, such as pause, the set top box 150 sends a message 112 indicating the Asset Identifier to which the pause function applies to. The CSP then identifies the appropriate generic current broadcast asset stored in the PLTV system. The CSP uses the current time to determine at what point to apply the trick function to the asset. For example, if the identified asset (e.g., the RTNP) started at 8:00 p.m., and a pause function was received at 8:06 p.m. and 32 seconds (indicated herein as "8:06:32 p.m.") after the program started, then the CSP would apply the trick function at that point of the asset.

Figure 1B:
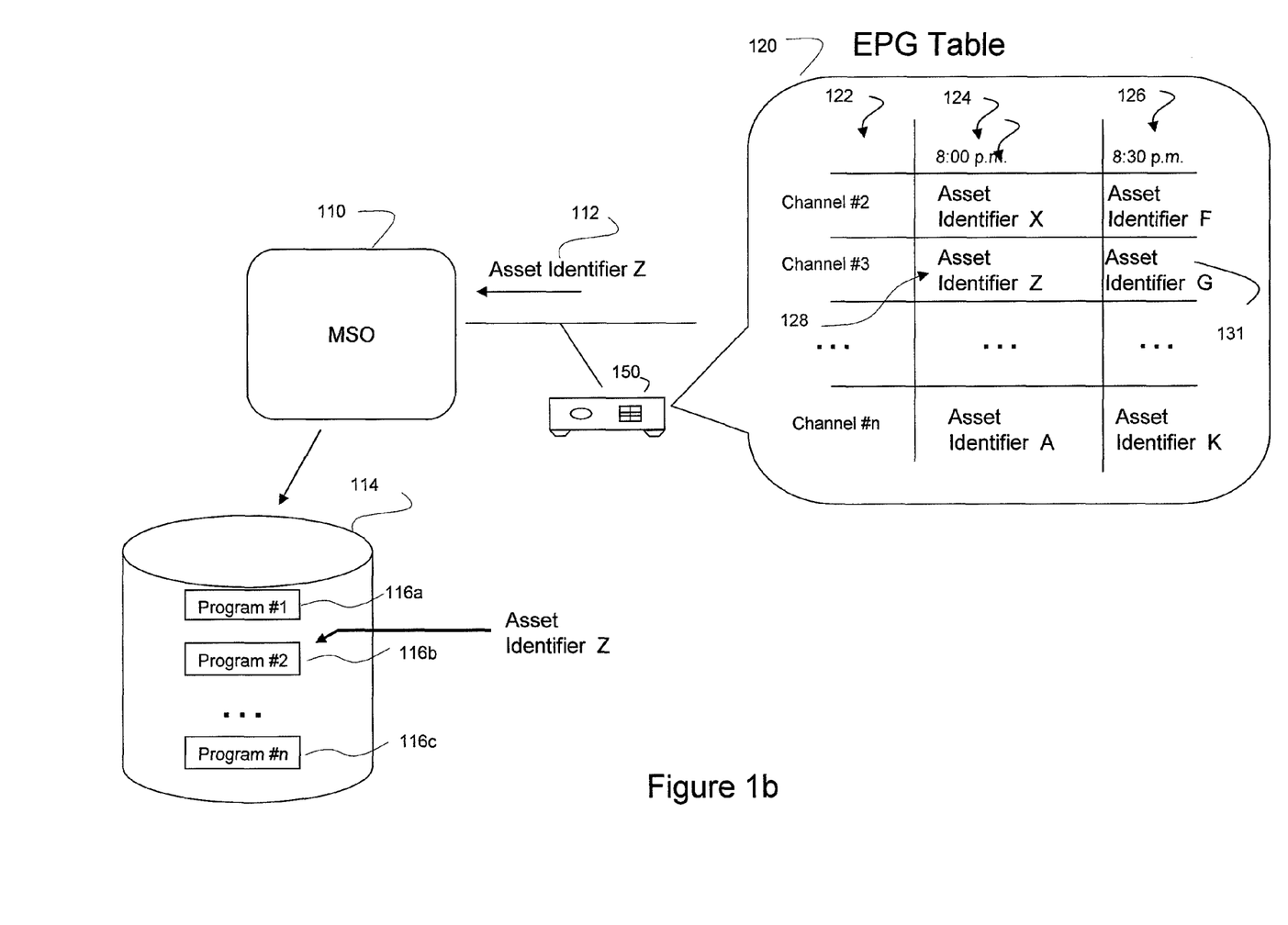

The above identification scheme requires that the set top box uniquely identify the asset to the CSP via the asset identifier. In FIG. 1b, one approach for identifying the asset is disclosed and uses the electronic program guide ("EPG") 120 that the set top box receives on a periodic basis from the MSO. The EPG indicates what programs are provided at which times and on which channels. This information is also used by the set top box to create a visual program guide for the viewer, which may be presented to the viewer by accessing a dedicated channel, or which the STB can use to locally generate the program guide interface to the viewer. Although the program guide is shown as a table in FIG. 1b, this is to facilitate illustration of the information to humans, and any type of data structure may be used by processors in the set top box. As used herein, "set top box" is not to be interpreted as limited to a cable system converter box, but as any converter box, whether used in a satellite, wireless, cable, or fiber optic distribution network. Thus, any type of device performing the converting of digital video signals from the service provider to a format that can be processed by a television could be considered a set top box.

The EPG table 120 in this embodiment is shown as having a column 122 for the channel number, a column 124 for the asset identifier for a given time period, followed by another column 126 for asset identifiers for a subsequent time period. Thus, for example, Asset Identifier Z 128 identifies the asset shown on channel 3 between 8:00 p.m. and 8:30 p.m. When the set top box sends a message indicating Asset Identifier Z, the MSO 110 knows what asset is being referenced. In this case, Program #2 116b is the asset identified in the server 114 as Asset Identifier Z. The EPG table is the means by which identification of the asset is synchronized between the set top box and the PLTV system.

The above asset identification scheme functions properly if the program occurs during the time it is indicated by the EPG. Normally, this is the case, but in various instances, the program may not be actually delivered by the MSO over the cable network at the time indicated by the EPG. There are various situations resulting in the programming being unsynchronized with the indicated EPG play times. First, it is possible that an unscheduled program may interrupt (and time-shift) the program relative to its schedule. Presidential speeches, emergency news or weather reports, etc. may occur after the EPG is transmitted by the MSO to the set top box. Second, many programs, such as live broadcast sports events, often extend beyond the scheduled play time. For example, a sports event, such as a baseball game may be scheduled to end at 10:00 p.m., but if the score is tied in the $9^{th}$ inning, may be continued to be broadcast past 10:00 p.m. The alternative would be to terminate broadcasting of the live program at the end of the game, which would be adversely accepted by viewers. Thus, the appropriate solution in many instances is to delay starting of other programs. This results in the EPG being inaccurate or out-of synchronization with respect to the actual programming on the channel. Typically, the program schedule is then re-synchronized by the beginning of the next morning.

In such cases where a program extends beyond its scheduled time, the set top box would expect that a particular asset is available on a channel at the given time according to the EPG, but in fact, the program is not available when it is indicated. Thus, if the set top box used the previously described process for indicating the asset identifier to apply a trick function to, an error would occur.

Similar problems can occur even when the programs conform to the schedule indicated in the EPG. Using the example shown in FIG. 1b, if the viewer invokes a trick function, such as 'pause' at 8:29:00 p.m., the asset identifier associated with channel #3 is Asset Identifier Z 128. However, if the viewer attempts to resume the program three minutes later, (e.g., at 8:32:00 p.m.), then according to the EPG table 120, the asset identifier for the program at 8:30 p.m. would be Asset Identifier G 131. However, that is obviously a different program and Asset Identifier Z should have been sent, instead. Thus, when VOD equipment is adapted in the manner described above, the system operation is improper.

While the MSO may be aware of the change in programming (e.g., a program extending beyond its scheduled time), the MSO may not have transmitted an updated EPG to the set top box. Doing so would increase the amount of traffic on the cable network, because any channel encountering a change in programming would require the MSO transmitting an updated EPG to all the set top boxes. Further, doing so would not address the problem described above, when a trick function is invoked near the end of a scheduled program and resumption occurs after the programmed has ended its live broadcast.

Further, in many cases, the MSO is not necessarily aware of changes in the programming, as it may rely on the EPG provided by other parties for the nominal program status. Furthermore, the above presumes that the MSO is aware of each delimited program, and is capable of storing the program as an identifiable asset. This increases the complexity because of the aforementioned potential problems. In some embodiments, the MSO is not necessarily aware that a program has changed relative to its scheduled time. Thus, the MSO cannot accurately rely on the content of a particular channel during a certain time window as involving a particular program.

Figure 2:
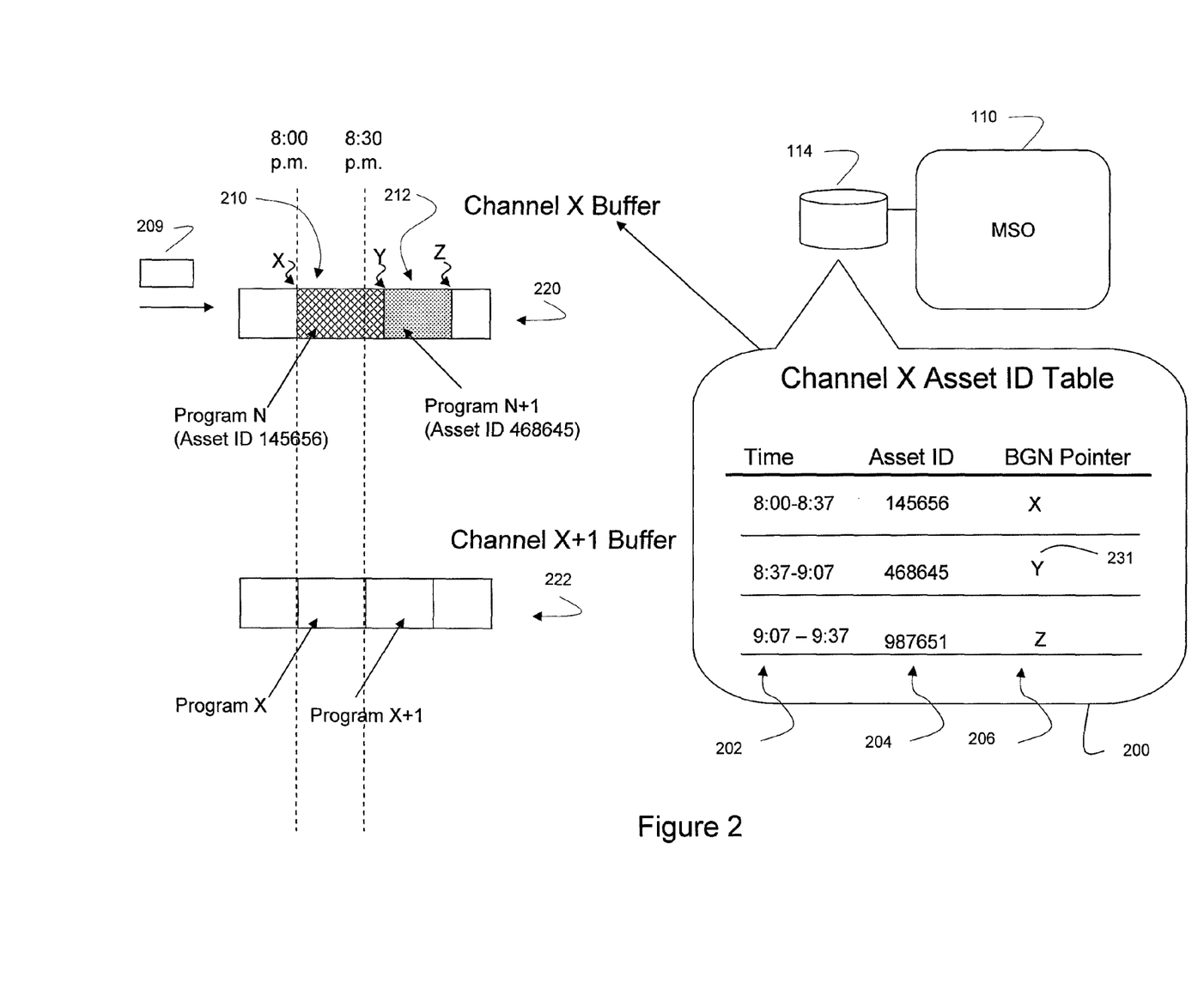
FIG. 2 illustrates one embodiment of the present invention of mapping a trick function request to a program stored in a buffer.

One approach to address this problem according to the present invention is shown in FIG. 2. FIG. 2 logically depicts two programs being streamed from two channels into two separate buffers in the PLTV system. First, programs are streamed into buffer 220 associated with Channel X, and there is also a buffer 222 storing programs streamed on Channel X+1. The programs in buffer 220 on Channel X comprises programs 209 received from a program source over a distribution network, for example a satellite link. As previously indicated, these programs are also streamed over the cable network to be made available to subscribers for normal viewing. Thus, the storage buffers 220 and 222 are associated with the PLTV service and not required for regular program distribution (e.g., non PLTV service) over the cable network. The programs in the buffers are only used if a subscriber invokes a trick function. In the example shown, Program N 210 is shown stored in the buffer as being initially received at a beginning time ("X") of 8:00 p.m. and continuing to an end time ("Y") after 8:30 p.m. Next, program 212 is streamed, beginning at start time "Y" and ending at end time "Z". In this embodiment, Program N is identified by Asset Identifier 145656 and Program n+1 is identified by Asset Identifier 468645. Those skilled in the art will recognize that a variety of numerical identification schemes can be used to convey an identifier for the asset.

As the PLTV system receives such broadcast programs, a channel asset identifier table 200 is updated. The structure for this table can vary, and in this embodiment, a single table is dedicated for Channel X is shown. In other embodiments, different data structures can be used, including a table that indicates assets on a variety of channels. As seen from the Channel X Asset ID Table 200, entries in the first column 202 indicate the start and stop time for each asset. The second column 204 indicates the asset identifier value, and the third column indicates a Beginning ("BGN") point value. The BGN pointer value identifies a start location in a file in the buffer 200 for the associated generic current broadcast asset. In this embodiment, the pointer for Program N is BGN Pointer "Y" 231.

The buffer is not of unlimited size, and its size can be adjusted as appropriate. For example, the MSO will likely define a maximum time period for which RTNP can be delayed (e.g., paused) and resumed. For purposes of illustration, this is assumed to be two hours. Thus, buffer 220 stores a maximum of two hours of RTNP video data. This storage buffer can be implemented as a circular buffer, which overwrites the oldest video data information with the newest information. As noted before, the contents of the RTNP are being stored in real time, in a continuous manner. Logically, this buffer can also be viewed in one embodiment as a first in, first out queue. Various storage implementation techniques can be used in lieu of a circular buffer using a beginning pointer. For example, for a given channel separate buffers could be created, one for each program. Thus, a series of buffers would exist for a given channel for each program over the defined timer period (e.g., over a two hour period, there could be four buffers for storing four thirty minute programs). Regardless of the storage technique used, the PLTV system incorporates a method by which the particular asset can be identified within the buffer. In this case, the BGN Pointer in the channel asset identifier table indicates where in the buffer the starting point for that particular asset can be found. In other embodiments, other pointer methods can be used.

This approach avoids the aforementioned errors if the program's availability does not align or synchronize with the EPG schedule. When the viewer invokes a trick function, the set top box does not have to consult the program guide to identify the asset identifier associated with the presently tuned channel. Rather, the set top box merely indicates to the MSO the channel presently viewed by the user in a message along with the set top box identifier and an identifier indicating the trick function. The MSO receives the requested trick function in real time, and the PLTV system identifies the appropriate Channel Asset ID table associated with that channel at that time. In this case, the set top box indicates it is tuned to Channel X, and the PLTV system identifies table 200.

Recall that the Channel X Asset table is continuously updated. The actual real time table is updated chronologically as programs start/stop. Thus, if the set top box initiates the trick function at 8:15 p.m., there would not have been yet created the second and third rows in the table. Thus, FIG. 2 illustrates an omniscient view, which includes programs that have not yet occurred. This is for the sake of illustration of the invention. Obviously, at 8:15 p.m., it is clear that the current Asset Identified for Channel X is 145656 (in the first row), and that the BGN Point is "X", and the subsequent rows would not yet exist. However, if the user invokes the trick function at 8:15 p.m., the start time for the current program on this channel would be known (e.g., 8:00 p.m.), and PLTV system 114 can readily calculate an offset from the BGN Pointer representing 15 minutes into the program. For example, it would straightforward to define the storage structure to calculate a pointer into the buffer for each second of operation. Thus, the number of seconds from the starting time can be readily calculated and used to determine the appropriate pointer into the buffer. Thus, knowing the starting time and the present time allows determination of how much time has passed from the initial location of the program in the buffer.

In the above case, the network (nor the set top box) may not know in advance the time at which the present program, which started at 8:00 p.m., actually ends. As shown in FIG. 2, Program N 210 actually extends beyond its scheduled ending time of 8:30 p.m. until 8:37 p.m. Obviously, this would not be known until that point of time. Thus, regardless of when Program N ends, if the set top box indicates the channel presently tuned to, the MSO can determine the program being viewed.

Figure 3A:
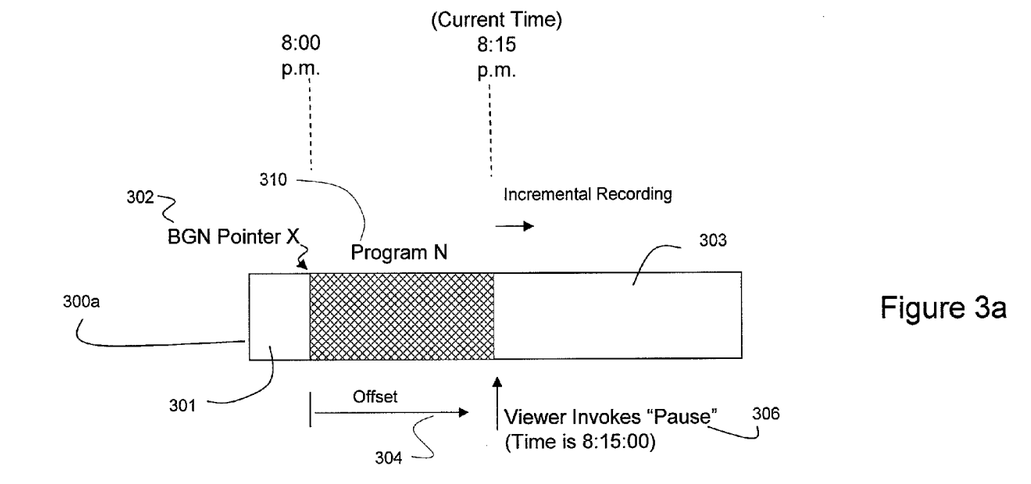
FIGS. 3a-3d illustrate various embodiments of the present invention of a method for processing a trick function from a user.
Figure 3B:
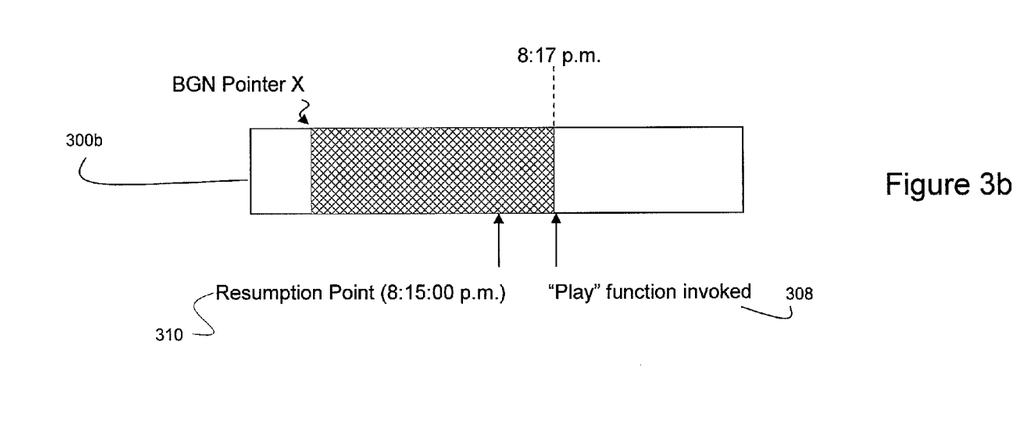

This buffer storage scheme is shown in further detail in FIGS. 3a and 3b. In FIG. 3a, a buffer 300a is shown that is dedicated for real-time storage of the programs associated with a particular channel. In this case, a previously received program 301, was previously recorded in the buffer. The system is presently recording Program N 310, which started at 8:00 p.m. Presently, the time is 8:15 p.m. and the program is being incrementally recorded in real time, so one can logically think of data of Program N being stored by expanding to the right side with the progression of time, and over-writing the oldest program 303.

At 8:15 p.m. precisely (denoted as 8:15:00 p.m.), a viewer invokes the "pause" trick function 306. The network can readily determine the difference between the present time and the starting time of the program by accessing the aforementioned table which stores the beginning time. By knowing the time into the program, an offset 304 can be readily determined. Thus, the trick function is invoked 15:00 minutes into the start of the program. By adding the offset pointer to the Beginning Point X 302, the system can readily locate the position in the buffer for the channel for which the pause function was invoked. The network will record the time or location (i.e. "resumption point") at which the "pause" function was invoked by the set top box.

Once the user invokes the "pause" function, the set top box can, in one embodiment, 'freeze' the current image. At a latter point in time, the viewer can resume the play of the video program by invoking the "play" function. This is depicted in FIG. 3b. In this case, the viewer invokes the "play" function 308 at 8:17 p.m., two minutes later. Upon receipt of this function, the network knows that two minutes have elapsed, and can provide the video to the viewer starting at the previously noted resumption point 310. In this manner, the PLTV system is able to resume streaming video at the correct point, and the viewer appears to have "paused" live television, and resume viewing it shortly later. In another embodiment, the PLTV system can present the 'freeze' image to the set top box by directing the set top box to another channel immediately, instead upon receipt of the "play" function.

The above embodiment presumes that the MSO is able to delineate when one program ends, and the next program begins, in any given storage buffer. Thus, by delineating each program, the channel asset identifying table is populated to identify each particular asset. However, in another embodiment, the MSO is not able to delineate when each program begins/ends. Thus, programs associated with a given channel are stored in a dedicated channel buffer without delineation. In such embodiments, the buffer still maintains a fixed time (e.g., 2 hours) of recording, but there is no program delineation maintained by the MSO. Thus, the channel asset identifier table does not identify each asset by time, and hence only maintains a pointer to the beginning of the buffer. In this embodiment, the set top box still indicates which channel is involved, and the MSO identifies the particular buffer involved. The reference to a particular time in the buffer is determined by an offset from the beginning of the buffer, not from the beginning of the start time of a particular program.

Figure 3C:
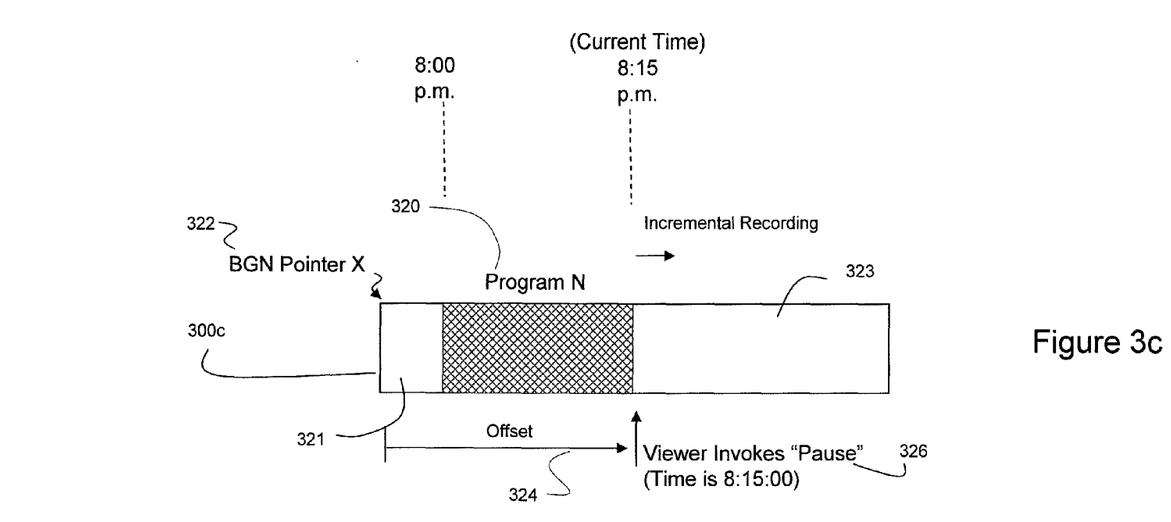
Figure 3D:
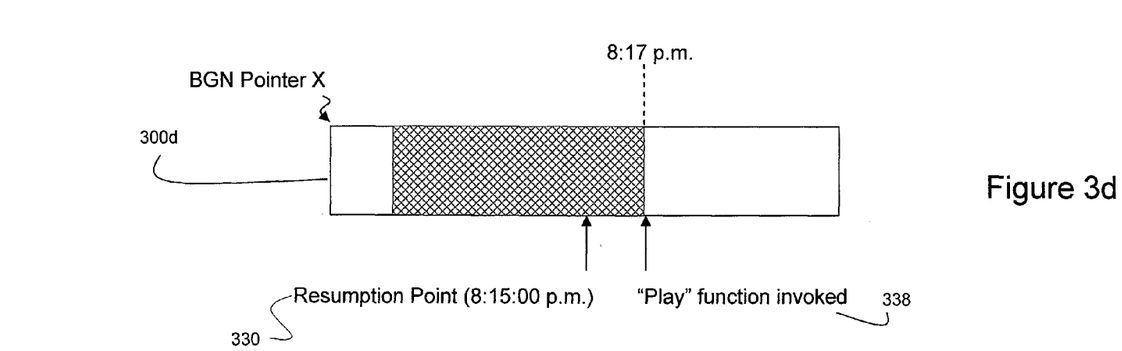

This is illustrated in FIG. 3c and FIG. 3d. In FIG. 3c, the BGN Pointer X 322 points to the beginning of the buffer. Although Program N 320 is shown as occupying a portion of the buffer 300c, the system does not know where the previous program 321 ends and Program N 320 begins. However, if the viewer invokes the "pause" 326 function at 8:15:00 p.m., the system determines the offset 324 as calculated from the BGN Pointer X 322 for that particular channel buffer. In FIG. 3d, when the user invokes the "play" function 338 at 8:17:00 p.m. for the same buffer 300d, the system knows the resumption point 330. This is determined by storing the previously determined offset for that user. Thus, in this embodiment, the MSO does not know when any particular program ends or begins (which does not adversely impact the operation of the PLTV service), and this simplifies the channel asset table to merely maintaining the beginning point of the buffer, and the resumption point for each user.

Figure 4:
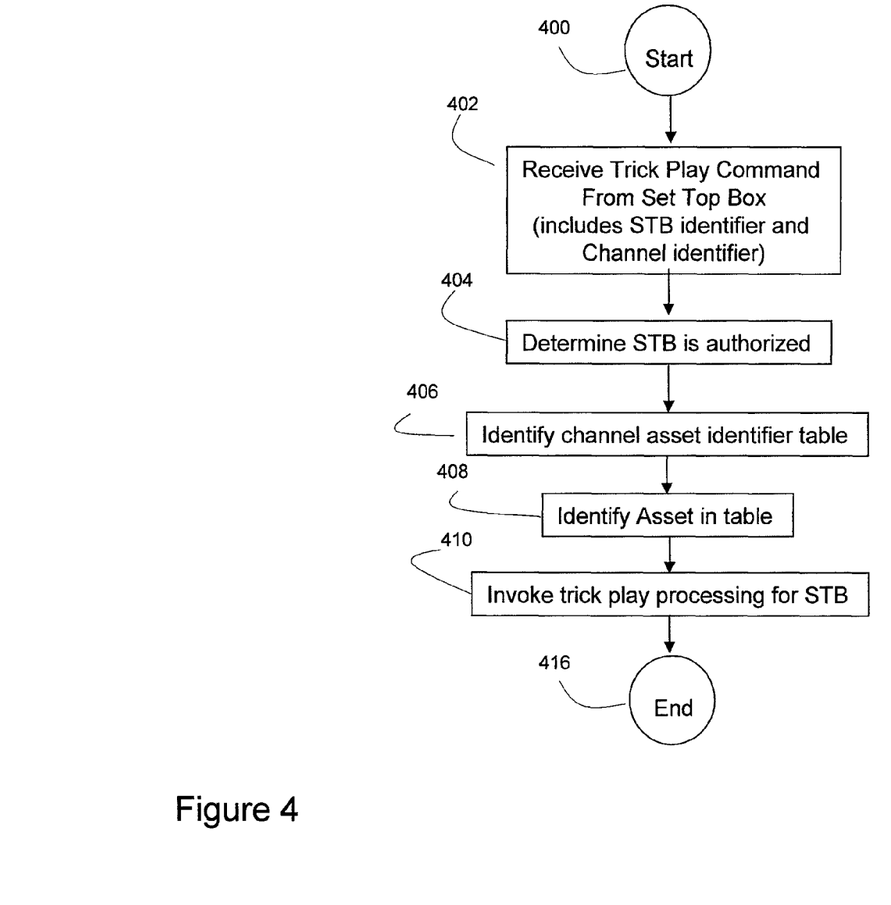
FIG. 4 illustrates one embodiment of the present invention of a method for processing a trick function from the user.

One embodiment of the processing performed by the PLTV system in the cable network is shown in FIG. 4. The MSO and PLTV system is continuously able to receive and process trick commands from a set top box. In step 402, the MSO receives the trick command from the set top box, wherein the message includes the channel identifier and set top box identifier. The set top box may be required to be authorized by the MSO prior to executing the trick function. The authorization may occur for various reasons, including so that the server can determine that the subscriber associated with the set top box is authorized to invoke the function in step 404 (e.g., to ensure that the subscriber is in good credit standing with the service provider). In other embodiments, this step may be required as the MSO may offer the capability on a selective basis for certain subscribers, or that the function may be limited for use with only certain channels or television programs. Assuming authorization is granted, the PLTV system in step 406 identifies the asset identifier table based on the channel identifier, and in step 408 identifies the particular asset in the table. The authorization may be performed either by the MSO, the PLTV system, or both in cooperation with each other.

In step 410, the PLTV system then invokes the trick play processing for the set top box, and the particular process involved will depend on the particular function invoked. The process is completed in step 416.

Figure 5A:
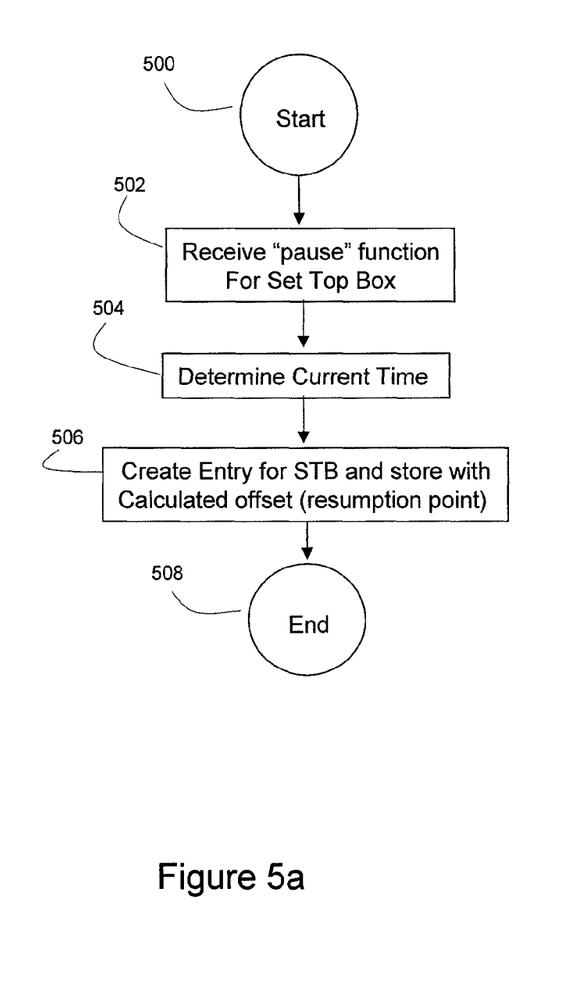
FIGS. 5a and 5b illustrate one embodiment of the present invention of processing the "pause" and "play" trick functions.

The particular steps invoked for each trick function will vary based on the trick function and the set top box making the request. For example, in FIG. 5a, the process for invoking the "pause" function is shown. In step 502, the server receives the "pause" function and notes the current time. Because the delay from sending the function request at the set top box to the server is minimal and the PLTV system is receives the request in real time, there may not be a need to convey in the message the time of invocation occurred from the set top box. However, in other embodiments, the time may be conveyed by the set top box to more accurately identify the time which the function is invoked. The PLTV system then creates an entry in memory for that set top box indicating that the "pause" function has been invoked, and calculates the offset, which is referred to in this context as a "resumption point." In other words, the offset value (a pointer) is determined and stored in memory and associated (linked) in some manner with the set top box identifier. As described earlier, the offset can be determined from the beginning of the buffer or from the beginning of the asset in the buffer. The PLTV system may also note the asset identifier, if known. In one embodiment, the set top box will locally suspend display of the program— e.g., the set top box will freeze the image on the television, so that the PLTV system does not have to stream the video asset at this point in time. In other embodiments, the set top box may be immediately directed to another channel on which the paused program is displayed, or the MSO may alter the video stream delivered to the set top box, as discussed below.

Figure 5B:
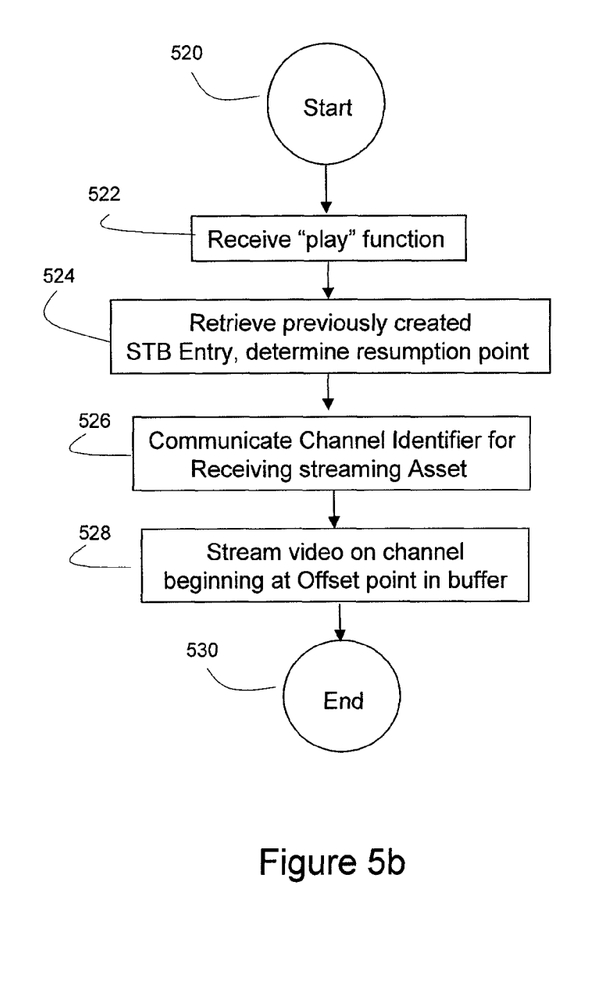

At some time later, the viewer will invoke the "play" (or "resume") command and another message will be sent. Whether there is a separate function created for "play" versus "resume" depends on the embodiment, but in this embodiment, they are assumed to be the same. In either case, after receiving the "play" function in step 522, the server retrieves the previously created table in step 522. This can be described as a 'state table', since it describes the particular state of the trick function status for the individual set top box and only certain functions can be invoked at certain times. For example, a video being presently viewed can have the "pause" function invoked, but if the program is already being viewed, then invoking "play" or "resume" does not make sense. "Play" or "resume" only makes sense if the program is not presently being viewed. Further, a movie that has already been "paused" can be "played" or "resumed", but it cannot be "paused" again. The state table ensures that only valid functions are being invoked for that specific set top box, based on the current state of the program involved. The creation of the state table depends on the set of trick functions recognized by the service, and is within the capability of one skilled in the art.

The message conveying the "resume" command includes the set top box identifier, an optional channel identifier, and the trick function identifier. The channel identifier is optional, as some embodiments may use the set top box identifier to determine the channel, based on the set top box being limited to "resuming" the same channel for which "pause" was previously indicated. In other embodiments, it may be possible to invoke various trick functions for multiple channels simultaneously. If so, then the channel identifier is required, in order to identify the appropriate state table for the set top box.

The retrieval of the state table in step 524 allows the PLTV system to ascertain that the requested trick function is valid, and also allows the PLTV system to retrieve the resumption point. At this point, the PLTV system can prepare to stream the identified video asset on a particular channel. First, the PLTV system at step 526 communicates the new channel or data stream identifier to the set top box, and then in step 528, the PLTV system then streams the video beginning at the offset or resumption point previously stored. In one embodiment, the set top box then processes the new channel or data stream which has the program presented at its resumed point, and it appears to the viewer that the live program has been paused, and has been resumed. In other embodiments, the set top box may not tune to another channel, but may continue to process video on the same channel. For example, if the set top box is tuned to a channel dedicated to it only (e.g., the channel conveys programming that is unicast only for that set top box), then the MSO could interrupt the RTNP upon receipt of the "pause" function, and resume it upon receipt of the "play" function. During this time, the set top box processes a single channel and the pause and resume function is performed in a system in the service provider. Similarly, for IPTV (Internet Protocol Television), the video information is sent using IP packets, and there is no "channel" to tune to, but rather a particular packet stream which is identified for processing by the set top box. Thus, the present invention can be adapted and also used in a dedicated switched channel environment, or an IPTV environment as those skilled in the art will readily appreciate. Thus, the present invention can be used by a variety of video program distributors, and is not limited to cable service providers.

Figure 6:
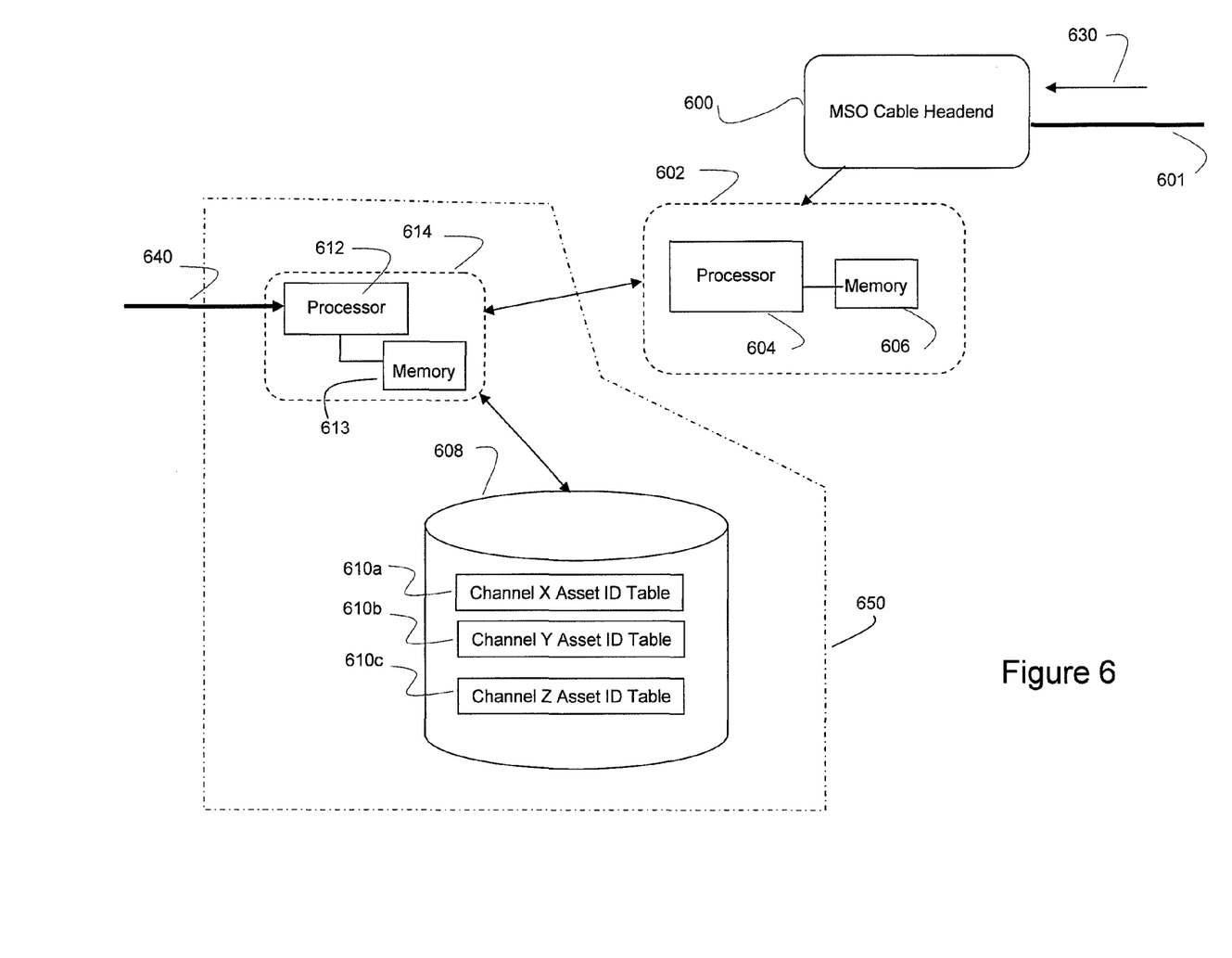
FIG. 6 illustrates one embodiment of a network based personal video recording system.

One embodiment of the structure that can perform the above steps is shown in FIG. 6. In FIG. 6, the cable distribution network 601 is connected to the MSO cable headend 600. Messages 630 conveying the trick function commands from the set top box are conveyed over the distribution network 601 and received by the MSO cable headend 600. These messages also include the STB identifier and the channel identifier (and the optional channel identifier). These messages are identified by a computer system 602 which comprises a processor 604 and memory 606. This system recognizes that the message indicates a trick function (as opposed to some other type of message) and system 602 forwards the message to the PLTV system 650. The PLTV system 650 comprises a computer system 614 which is shown here as having a processor 612, but which includes other conventional computer system components, such as a memory 613. The computer also accesses a database storage system 608, which stores the various channel buffers 610 for the various channels, wherein there is a separate identifiable buffer for each channel (e.g., channel buffer 610a for Channel X, channel buffer 610b for Channel Y, etc.). The memory 613 is used by the processor 612 to create or access a state table entry for each set top box message conveying a trick function as needed.

The PLTV system 650 is able to stream the video asset from a particular channel buffer to the MSO cable headend via communication facility (not shown) between the storage facility 608 and the cable headend 600. Further, the PLTV system 650 receives in real time the various live programs via an interface 640. The computer system 614 of the PLTV system 650 ensures that the contents are stored in the appropriate buffer 610 in real time and that the channel asset identifier tables are updated as needed. Thus, the incoming RTNP video streams are typically always continuously recorded into the buffers, even if no users are presently invoking the PLTV service.

In this manner, the PLTV system receives real time network programming and stores each program in an individually identifier buffer (where the individual programs may or may not be delineated within each buffer). The PLTV system also receives the messages from the set top box for invoking a trick function, and ensures that the message is properly processed, and that a unique state table entry is created for each set top box as required. Further, the PLTV system is able to determine any offsets for fulfilling trick functions, and is able to stream video from a particular buffer to the cable headend on a given channel, so that the set top box can tune to the same program (if required), but which is delivered in a 'time offset' manner and reflects the trick functions invoked by the user.

Alternative embodiments of the PLTV system include moving copies of the assets in the real-time channel buffers into long term storage. As previously indicated, the buffers in storage database 608 can be overwritten with new data. In this alternative embodiment, the programs can be copied into long term storage, which can then be retrieved by users by identifying the particular program, channel, and/or date. When the contents of the buffers are moved into long term storage, as discussed earlier, the individual assets may or may not be delineated. If the assets are individually delineated, then each program can be individually identified in long term storage, or if not individually delineated, then the entire buffer contents may be stored. In this manner, the same structure that initially captures live program and provides PLTV service can also be used to archive the programs, and provide a more traditional VOD service. Namely, users can request to view a program that is no longer currently being broadcasted over the cable network. Some live programs may be restricted for various reasons from being stored in long term storage, and thus the PLTV system can selectively store live programming in the real time channel buffers or in long term storage, based on these restrictions. In this embodiment, a number of mechanisms can be used for presenting options to the viewer for selecting a particular program, identifying the selection to the cable service provider, and retrieving the asset from long term storage. Such graphical user-interfaces are well known in the art.

The set of the trick functions recognized by the system, which may include "pause", "play", "fast forward", "slow-motion", and "rewind" can be augmented or further limited. These functions are typically indicated by dedicated function keys on the handheld remote control. Further, the exact message formats sent by the set top box to indicate the requested function, the relevant channel, etc., may vary as to their formats and contents. Further, the message format may indicate the time the function was invoked.

The set top box is required to have software to support the PLTV feature, which includes the ability to send the above identified messages. In addition, the set top box may provide other features, such as locally "freezing" the image of the present channel when the "pause" function is invoked. The set top box may also implement other processes which ensure that only valid trick functions are sent to the network at the proper time (e.g., a program presently viewed cannot be "resumed" if it has not been previously "paused"). In some embodiments, where the user is only allowed to invoke trick functions on a single channel, the set top box/handheld remote would send a message to cancel a previous "pause" command initiated for Channel X, if the user changes to Channel Y and then invokes "pause" again. In other embodiments, the set top box would be capable of receiving a command to switch to another channel after sending a trick function, where the modified video is transmitted by the service provider. For example, broadcast television may be received by the set top box tuning to channel X, and when sending a "pause" command, the set top box may be command to tune to channel Y, which is presented with the "freeze frame" image. Alternatively, the set top box may be commanded to tune to channel Y in response to sending a "resume" command, where the program is streamed from the point at which it was initially paused.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing a program distribution service to a user and for providing a pause-live television (PLTV) service to the user, the method comprising:

performing, by a video program distribution system, the program distribution service by providing a plurality of channels to a converter device associated with the user, wherein the user uses the converter device to select a specific channel;

providing, by the video program distribution system, a plurality of buffers where each one of the buffers is dedicated for storage of broadcast assets associated with each one of the plurality of channels distributed to the converter device, wherein the plurality of buffers are dedicated only to the PLTV service and are not required for the program distribution service, and wherein the broadcast assets stored within any one of the plurality of buffers are only used if the user after selecting the specific channel uses the converter device to invoke a trick function;

receiving, by the video program distribution system, a first message sent from the converter device, wherein said first message does not comprise an asset identifier but does comprise a converter device identifier, a channel identifier, and a first trick function identifier indicating a pause function;

determining, by the video program distribution system, a current time upon receiving the pause function;

identifying, by the video program distribution system, a channel asset identification table associated with the channel identifier at the current time;

creating, by the video program distribution system, an entry in a memory for the converter device indicating that the pause function has been invoked;

determining, by the video program distribution system, a pointer associated with said converter device based on the current time, wherein said pointer indicates a location within one of the buffers associated with the channel identifier and the channel asset identification table;

storing, the video program distribution system, said winter in a memory associated with said converter device identifier;

receiving, by the video program distribution system, a second message sent from said converter device after said first message, wherein said second message comprises said converter device identifier, said channel identifier, and a second trick function identifier indicating a play function;

retrieving, by the video program distribution system, said pointer from said memory; and, using, by the video program distribution system, said pointer to cause a portion of the broadcast asset in said one buffer to be transmitted to said converter device beginning at said location identified by said pointer.

2. The method of claim 1, wherein the converter device is a set top box.

3. The method of claim 1, wherein the video program distribution system is a cable based video program distribution system, a satellite video program distribution system, a fiber optic based video program distribution system, a mobile wireless video program distribution system, a fixed wireless video program distribution system, or an Internet Protocol (IP) based video program distribution system.

4. The method of claim 1, further comprising processing, by the video program distribution system, the first trick function to determine whether a trick function can be performed.

5. A system for performing a program distribution service to a user and for providing a pause-live television (PLTV) service to the user, the system comprising:

a video program distribution system that performs the program distribution service by providing a plurality of channels to a converter device associated with the user, wherein the user uses the converter device to select a specific channel;

the video program distribution system comprises a plurality of buffers where each one of the buffers is dedicated for storage of broadcast assets associated with each one of the plurality of channels distributed to the converter device, wherein the plurality of buffers are dedicated only to the PLTV service and are not required for the program distribution service, and wherein the broadcast assets stored within any one of the plurality of buffers are only used if the user after selecting the specific channel uses the converter device to invoke a trick function, wherein the video program distribution system is configured for:

receiving a first message sent from the converter device, wherein said first message does not comprise an asset identifier but does comprise a converter device identifier, a channel identifier, and a first trick function identifier indicating a pause function;

determining a current time upon receiving the pause function;

identifying a channel asset identification table associated with the channel identifier at the current time;

creating an entry in a memory for the converter device indicating that the pause function has been invoked;

determining a pointer associated with said converter device based on the current time, wherein said Jointer indicates a location within one of the buffers associated with the channel identifier and the channel asset identification table;

storing said pointer in a memory associated with said converter device identifier;

receiving a second message sent from said converter device after said first message, wherein said second message comprises said converter device identifier, said channel identifier, and a second trick function identifier indicating a play function;

retrieving said pointer from said memory; and, using said pointer to cause a portion of the broadcast asset in said one buffer to be transmitted to said converter device beginning at said location identified by said pointer.

6. The system of claim 5, wherein the converter device is a set top box.

7. The system of claim 5, wherein the video program distribution system is a cable based video program distribution system, a satellite video program distribution system, a fiber optic based video program distribution system, a mobile wireless video program distribution system, a fixed wireless video program distribution system, or an Internet Protocol (IP) based video program distribution system.

8. The system of claim 5, wherein the video program distribution system is further configured for processing the first trick function to determine whether a trick function can be performed.

* * * * *

UNITED STATES PATENT AND TRADEMARK OFFICE
CERTIFICATE OF CORRECTION

Page 1 of 1

PATENT NO. : 9,210,454 B2
APPLICATION NO. : 14/294493
DATED : December 8, 2015
INVENTOR(S) : Alexander et al.

It is certified that error appears in the above-identified patent and that said Letters Patent is hereby corrected as shown below:

On the title page

Item (57), Line 7, delete "an" and insert -- a --, therefor.

In the drawings

Fig. 1a, Sheet 1 of 8, delete Tag "102an" and insert Tag -- 102n --, therefor.

In the specification

In Column 1, Lines 8-9, delete "2008, now pending." and insert -- 2008, now Pat. No. 8,776,157. --, therefor.

Column 3, Line 24, delete "NPRV-like" and insert -- NPVR-like --, therefor.

Column 3, Line 26, delete "NPRV-like" and insert -- NPVR-like --, therefor.

In the claims

Column 13, Line 12, in Claim 1, delete "storing," and insert -- storing, by --, therefor.

Column 13, Line 12, in Claim 1, delete "winter" and insert -- pointer --, therefor.

Column 14, Line 21, in Claim 5, delete "Jointer" and insert -- pointer --, therefor.

Signed and Sealed this
Tenth Day of May, 2016

Michelle K. Lee
*Director of the United States Patent and Trademark Office*